INVENTORS
ANDRES FRANCISCO LLOBET,
GIUILO RUFA
BY THEIR ATTORNEYS
HARRIS, KIECH, RUSSELL & KERN

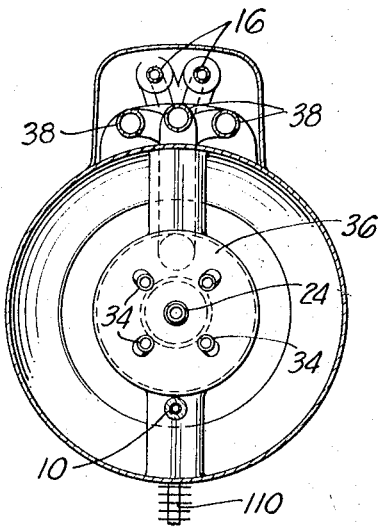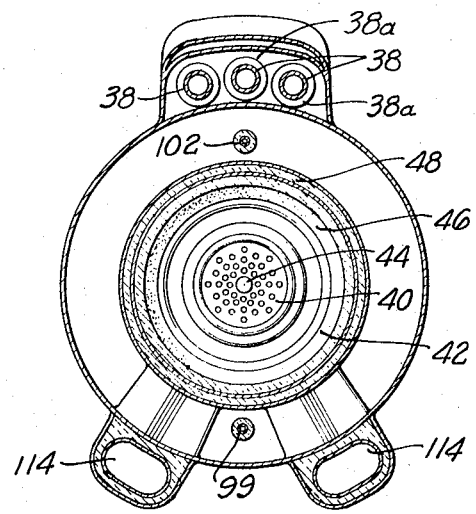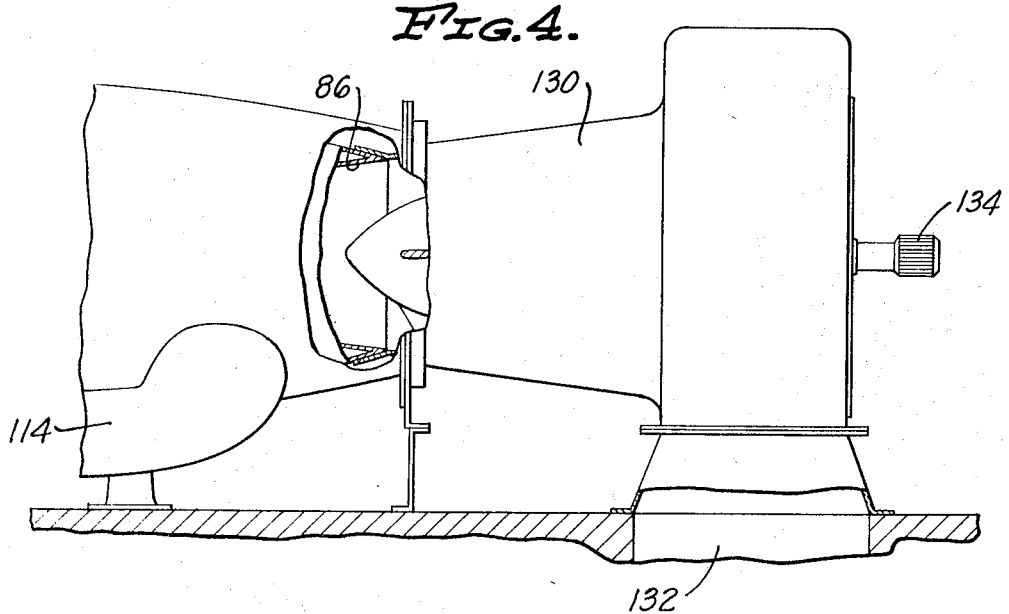

3,323,304
APPARATUS FOR PRODUCING HIGH TEMPERATURE GASEOUS STREAM
Andres Francisco Llobet, Juncal 1081, and Giulio Rufa, Avelleneda 2487, both of Buenos Aires, Argentina
Filed Mar. 1, 1965, Ser. No. 435,900
6 Claims. (Cl. 60—39.49)

This invention relates to apparatus and process for producing a high temperature gaseous stream and most particularly to an improved jet engine and method of operating a jet engine.

The apparatus for the invention has many applications and is suitable for the propulsion of aircraft and may be employed in such diverse applications as a power source for driving a stationary turbine and for the generation of a smokeless combustion gas for use in cement and ceramic manufacturing plants. The apparatus of the invention is also suitable for the generation of a high velocity gaseous stream for use in the aerodynamic testing of aircraft and missile models and may be used for the propulsion of a boat.

The apparatus employed as a jet propulsor has the weight of approximately 18 to 25% of an ordinary turbine engine and costs significantly less, perhaps 20% of the cost of a typical turbine engine. Where employed to power turbines, the efficiency of the engine is characteristically about 50%. As a jet engine, the apparatus has a standing efficiency of about 50% and an efficiency at high altitudes and supersonic speed of about 60%.

It is a principal object of the invention to provide a jet engine of simplified design.

It is an object of the invention to provide an improved gas generation apparatus of high efficiency and capability of diverse applications.

It is another object of the invention to provide a new method of operating a jet engine incorporating a high pressure gaseous fuel generation system.

It is another object of the invention to provide a jet engine having no moving parts save for auxiliary fuel equipment and the like.

It is a still further object of the invention to provide a jet propulsor type engine that is especially suitable for fixed place applications.

It is another object of the invention to provide a method of generating a high velocity gaseous stream suitable for many industrial applications.

The apparatus of the invention employs several unusual concepts in its makeup. Fundamental to the operation of the apparatus is the generation of a high energy, high temperature, gaseous, fuel stream from a mixture of hydrocarbon fuel and water. Heat of the engine is employed in a high pressure system to thermally crack hydrocarbon fuel in the presence of water to form the high temperature, high energy, gaseous, fuel stream which typically is at a pressure in excess of 140 atmospheres, preferably in excess of 160 atmospheres but may be as low as 0.5 atmosphere gage for some applications, and at a temperature usually in excess of 1000–1200° Kelvin (K.). The compression of the air needed for the combustion of the fuel is attained by using injectors and nozzles adapted for the generation of high velocity gaseous streams into which the atmospheric air is drawn by suction; that is, by the familiar aspirator principle, and compressed, first employing the high kinetic energy present in the high pressure, gaseous, fuel stream obtained by passage of that stream through a high pressure injector and then in successive expensions the energy of lower pressure gases produced at different stages of the operation of the apparatus. Some of the injectors used in the compression of the air employ moderately high pressure recycled combustion gases drawn from the combustion chamber. It is desirable that the combustion gases utilized in the injector applications have a relatively low temperature to improve the efficiency of the air compression and this feature permits the heating of the main gaseous stream passing through the engine at a downstream low pressure site by the withdrawn combustion gases before their delivery to the injectors. The withdrawn combustion gases may also be used for the heating of the high temperature, gaseous, fuel stream.

These and other objects and advantages of the apparatus and process of the invention will be more clearly understood in light of the following description and drawings wherein:

FIG. 2 is a cross-sectional view taken along line 2—2 of FIG. 1 of a fore part of the jet engine;

FIG. 3 is a cross-sectional view taken along line 3—3 of FIG. 1 through the combustion zone of the jet engine; and FIG. 4 is a fragmentary, partially sectional, elevational view of the jet engine of the invention used in combination with a stationary turbine.

Figure 1:
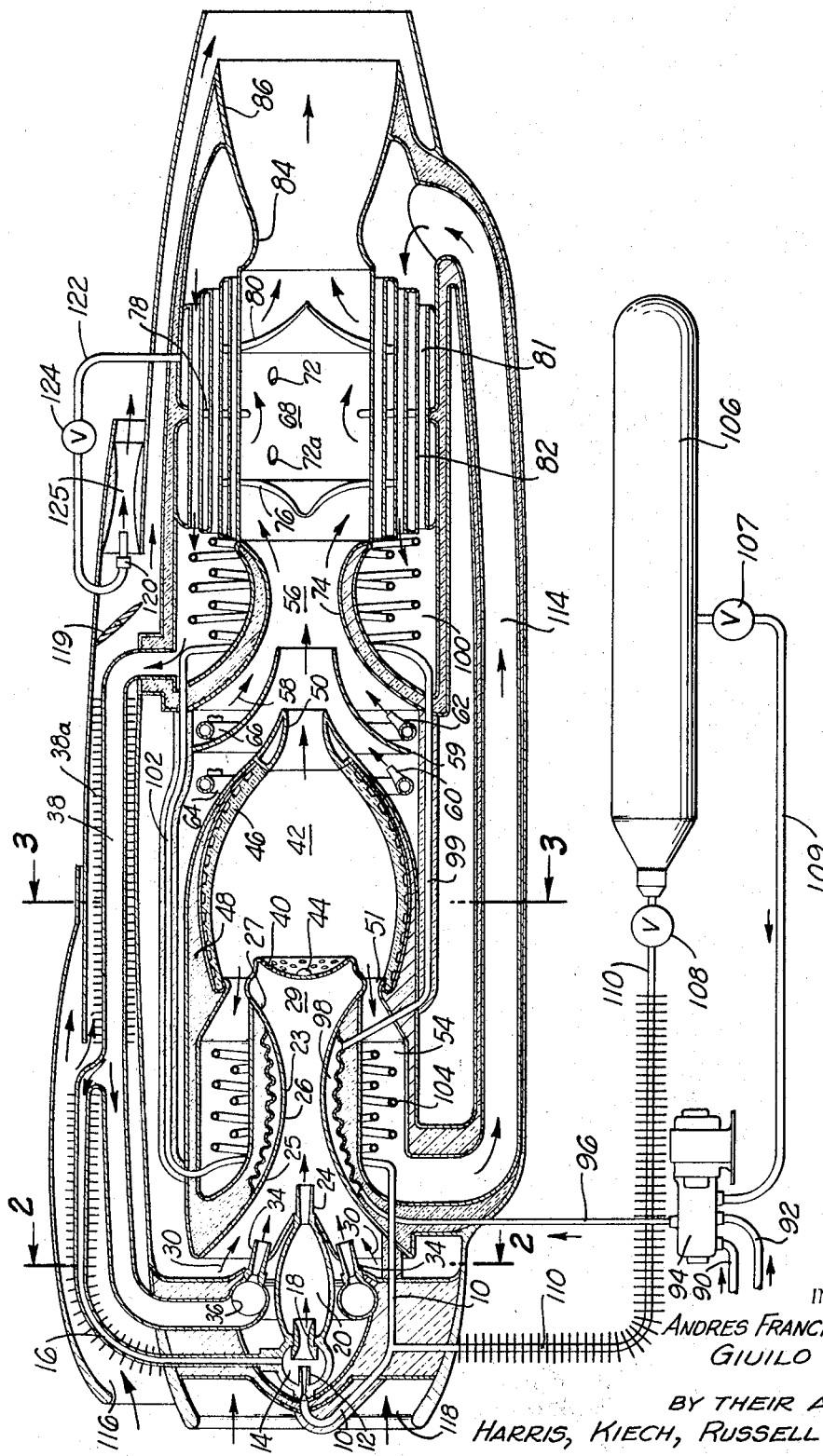
FIG. 1 is a schematic, longitudinal sectional view of a preferred embodiment of the jet engine of the invention.

Referring to FIG. 1, a high pressure, high temperature, gaseous, fuel stream, typically of a temperature of 1200° K. and 160 atmospheres, is delivered through an insulated line 10 to an injector 12 is located in a suction chamber 14 at the fore end of the jet engine. Air-cooled lines 16 opening into the chamber 14 deliver a cooled combustion gas, characteristically at 450° K. and 20 atmospheres to the chamber 14. The injector 12 is in alignment with the throat of a convergent-divergent nozzle 18 and directs a high velocity gaseous fuel stream thereinto. The high velocity gaseous fuel stream being at a low pressure provides an aspirator effect and draws combustion gas into the chamber 14 and through the convergent-divergent nozzle 18 into gasification chamber 20. The temperature within the gasification chamber is characteristically circa 1000° K. and the pressure about 80 atmospheres. The gaseous fuel stream exiting from the injector 12 is provided typically at about 1.3 kilograms per second and the combustion gas from lines 16 at 2.5 kilograms per second.

It will be appreciated that the temperatures, pressures, and masses mentioned herein are given only for illustrative purposes and that conditions may and will vary greatly with the application and particular circumstances under which the engine may be operating. For example, the conditions existing when an engine operates under the forced circumstances of an aircraft takeoff will vary radically from the conditions that may exist at cruising. The conditions are only mentioned as an aid in an understanding of the engine and its method of operation.

In the gasification chamber 20 there is a thorough mixing of the gaseous fuel and the combustion gases which latter gases will often contain approximately 50% air or thereabouts. From the gasification zone 20 the composite stream increases its temperature because of the air combustion and leaves at a high velocity through an injector 24 into the throat of a convergent-divergent passageway or venturi 26. The high velocity jet stream emitting from the injector 24 draws or sucks atmospheric air as indicated by arrows 30 from laterally disposed areas into the converging throat 25 of the venturi 26. That is to say, the high velocity jet stream being of a low pressure provides an aspirator effect and induces the inflow of atmospheric air into the venturi. The injector 24 is generally insufficient to induce the inflow of atmospheric air in the amount desired. To provide additional atmospheric air, four autoinjectors 34 are supplied. The autoinjectors 34 connect into an annular manifold 36 and are disposed a circular fashion as best seen in FIG. 2 about the centrally located injector 24. Cooled combustion gases are supplied by the line 38 which extend along the upper side of the jet engine where they are cooled by air coming in contact with fins 38a spaced along the lengths of the conduits 38. The induced flow of air into the venturi 26 will vary greatly but a typical flow is about 23 kilograms per second. The cooled combustion gases delivered to the four autoinjectors 34 may be at 20 atmospheres, possess temperature of 650° K., and be provided in an amount of about 20.5 kilograms per second.

The stream of air, combustion gas and gaseous fuel is compressed in the restricted throat 23 of the venturi 26, its divergent section 27, and zone 29 thereafter is delivered to a nozzle 40 at the mouth of a combustion zone 42. The nozzle 40, as best seen in FIG. 3, has a plurality of small holes and is provided centrally with an igniter 14 which is employed in the start-up of the engine.

The combustion zone 42 has a generally truncated egg shape and may be lined with a high temperature refractory material 46 which has placed thereabout further insulation material 48. The combustion zone 42 is provided with a converging wall outlet 50 which imparts to the exiting gases an exceedingly high velocity. The combustion zone temperature is subordinated to the materials resistance and typically operates at about 1500° K. and a pressure of 20 atmospheres. The inlet end of the combustion zone has an annular outlet 51 thereabout through which combustion gases are removed to an annular chamber 54. From the annular chamber 54, the withdrawn combustion gases are passed via a route hereinafter discussed and eventually delivered in a cooled state to the autoinjectors 34 and to the suction prechamber 14 earlier discussed. The combustion gases removed to the annular chamber 54 and recycled to the autoinjectors 34 and chamber 14 may constitute approximately one-half of the gases of the combustion zone 42.

High velocity combustion gases from the combustion zone 42 exit into a passage or chamber 56 into which there is an induced flow of atmospheric air as indicated by arrow 58, the flow being produced by an aspirator effect of the type described earlier. In same applications it may be desirable to provide high velocity combustion gases to increase the inflow of atmospheric air and this is done by autoinjectors 60 and 62 of manifolds 64 and 66 which are supplied with combustion gases from a downstream low pressure chamber 68 via drawoff ports 72 and 72a. The two sets of autoinjectors 60 and 62 are positioned on opposite sides of a hollow, truncated cone member 59 located in the passage 56. The quantity of air introduced into the passage 56 will vary greatly; for example, in the instance of a pressure of 10 atmospheres in the low pressure chamber 68, the amount of air introduced will be about 22.5 kilograms per second while at a pressure of 5 atmospheres, the amount of air induced may be as high as 65–70 kilograms per second. Again, it will be appreciated these data are provided for illustrative purposes and are not intended to be limiting.

The main gaseous stream, now made up of combustion gases from the combustion zone 42 and added air, flows through a venturi or convergent-divergent nozzle 74 into the low pressure chamber 68 where it has a somewhat tortuous path of flow imparted by baffles 76, 78, and 80 in order to bring the gases into contact with tubes 81 of a heat exchanger 82. The gaseous stream passing to the low pressure chamber 68 because of the large intake of air and increase in mass has been cooled below the temperature of the combustion zone 42, and in its passage through the heat exchanger 82 gains additional calories. The gaseous stream entering the low pressure chamber 68 is characteristically at circa 900° K. and leaves at about 1100° K. It will also be appreciated that there is an after burner effect provided by the added air and the unburned gaseous fuels of the combustion gas. The main gaseous stream after it leaves the low pressure chamber 68 is passed to a venturi 84 and subsequently is expanded and discharged through a thrust nozzle 86. In a typical expansion, the gaseous stream escapes from the nozzle at, for example, 564° K. and a velocity of 1060 meters per second.

It has been mentioned before that the high velocity gases emitted from the autoinjectors 34 are withdrawn from the combustion zone 42, passed to an annular chamber 54 and eventually delivered to the autoinjectors. Enroute to the autoinjectors, the withdrawn combustion gases are employed to heat the gaseous fuel to its high temperature and pressure and to impart calories to the main gas stream passing through the low pressure chamber 68. It is desirable to supply the withdrawn combustion gases to the autoinjectors 34 at a relatively low temperature and still at an elevated pressure for most efficient operation of the autoinjectors 34.

The gaseous fuel stream delivered to the injector 12 is produced by heating a mixture of hydrocarbon and water to an elevated temperature in excess of the cracking temperature of the hydrocarbon material. The gaseous fuel is provided to the injector 12 at a high initial pressure which is essential to the operation of the engine. The water prevents the buildup of carbon deposits within the lines which would occur at such high temperature but for the presence of the water. The water provides oxygen for the formation of carbon monoxide and the manufactured gas will typically contain in addition hydrogen, considerable methane, and other materials. Various hydrocarbons may be used including kerosene and gas oils. Hydrocarbon and water are supplied by lines 90 and 92 to a pump 94 which delivers the materials at high pressure into a system including a line 96 which leads to a jacket 98 about the throat of the venturi 26 preceding the combustion zone 42. The water and hydrocarbon fuel may be used in widely varying proportions depending upon the requirements of the engine and its application, but generally speaking the hydrocarbon will be used in a predominant amount. Water may make up 20% or so of the initial liquid mixture leaving the pump 94. 1.3 kilograms or so of gaseous fuel is provided per second to the injector 12. The fuel mixture passing through the jacket 98 cools the critical section of the venturi 26 and may be raised in temperature from say 288° K. to 320° K. From the jacket 98 the fuel mixture flows through an insulated line 99 to a heat exchanger 100 located adjacent the earlier mentioned heat exchanger 82. In heat exchanger 100 the fuel is elevated to a temperature of say 750° K. totally vaporized and from there is passed by a second insulated line 102 to a heat exchanger 104 disposed in the earlier mentioned annular chamber 54. In the latter heat exchanger, vapors of water and fuel are transformed to a permanent gas combustible and the gaseous fuel stream is raised to a typical temperature of 1200° K. and then delivered via line 10 to the injector 12.

In the startup of the engine a gaseous fuel is supplied from a high pressure tank 106 via an open valve 108 and a line 110 to line 10 and injector 12. In normal operation of the engine, following starting, valve 108 is closed but the latter valve will be open when it is desired to recharge the tank 106 by drawing off a portion of the gaseous fuel produced in the high pressure system. The temperature of the gas used for charging the tank 106 is cooled and in the instance of a stationary installation this may be done by a water jacket.

The combustion gases withdrawn from the gasification zone and passed to the annular chamber 54 are removed from the latter chamber by two parallel insulated ducts 114 (see FIGS. 1 and 3) and delivered to the heat exchanger 82 disposed in the low pressure chamber or area 68 where the high temperature combustion gases give up heat to the main gas stream passing therethrough. The withdrawn combustion gases which are removed from the fore part of the combustion zone will typically contain 50% or so of air. From the heat exchanger 82, the partially cooled combustion gases flow to the aforementioned heat exchanger 100 which has a generally annular shape. Here the combustion gases provide the heat needed to vaporize the fuel mixture and raise the temperature thereof to approximately 750° K. From the annular heat exchanger 100 the partially cooled combustion gases pass forwardly and overhead through the three aforementioned parallel ducts 38 which empty into the annular manifold 36 to which the several injectors 34 are held. The two branch lines 16 separate from two of the combustion gas lines 38 and continue forwardly, eventually turning down to connect into the small spherical chamber 14.

Air enters the fore part of the engine through cowling openings 116 and 118 and flows into the interior of the engine through several passages. Air flow passed through the combustion gas conduits 38 and 16 may be regulated by positioning of a damper 119 to increase or decrease air flow. An additional means for regulating air flow through the engine is provided by an injector 120 located in the air passage immediately beyond the damper 119. The injector 120 is provided with gas from the main gaseous stream flowing through the low pressure chamber 68 via a withdrawal pipe 122 which is opened and closed by a valve 124. The injector 120 discharges into the throat of a venturi 125. By regulating the amount of combustion gases emitted by the injector 120, the rate of their flow through the air passages of the engine may be regulated. In the case of a stationary installation, it will sometimes be desirable to employ water cooling for some components of the engine.

There is illustrated in FIG. 4 an installation wherein a stationary turbine 130 has been fixed to the nozzle 86 of the jet engine of the invention. Exhaust gases are removed from the turbine via a down duct 132 and power is taken off through a shaft 134.

The following are some of the desirable features of the pressure gas generator of the invention:

(1) The attainment of a high temperature and pressure gas by the vaporization of a mixture of fuel and water by heating.

(2) The compression of the air needed for the combustion and dilution and the cycles realization, using injectors, and medium and low pressure auto injectors or air accelerators utilizing first the kinetic energy developed at the high pressure injector and then (in successive expansions) also the energy of the gases that it produces (medium and low pressure).

(3) For having a low pressure chamber with double heat recuperator in which the calories taken from the auto injector's gas are used to heat up the gases that go through this chamber and also heats up the fluid mixture to be vaporized and turned into a high pressure gas later on.

The gas generator is rather simple and it works with almost any kind of fuel, liquids, pulverized solids, colloidals, and gases. For a jet propulsor its system is extremely simple because it doesn't have any rotating parts like in the conventional type of compressor-turbine engines, or any other moving part unless a very small engine for the fuel pump and any other auxiliary services.

The generator could be made with chambers ranging from 25 to 30 absolute atmospheres of pressure and with a jet speed very close to 1500 m./sec. The high pressure chambers could stand very high temperatures without too many technological problems thus obtaining a higher efficiency because a greater adiabatical expansion is obtained.

The efficiency at standing point is of about 50% and at high altitudes and supersonic speed is about 60%.

The jet propulsor's weight is about 18% to 25% of a turbine enginepower and its cost ranges from 10% to 20%.

When powering turbines the total efficiency would be of about 50%. The low pressure gas generator of the invention can be used as a steam boiler's burner in cement factories and ceramic industries because of its capability of producing a smokeless combustion of a high efficiency and low cost. The gas generator's fundamental parts include:

(1) High pressure cycle.
(2) Autoinjectors.
(3) Air cycle.

(1) *High pressure cycle* (of one or more stages).—To work, the gas generator's main thing is to have (like in the ram jets) an initial air speed going into it; the gas generator cannot start without having a high initial pressure.

(*First stage*) A fuel and water mixture are compressed by a pump (from 0.5 to 200 atmospheres) in a coil which is heated to about 1000 centigrade degrees; this is enough for the vaporization and gasification of the mixture that turns into a permanent combustible gas at the pump's pressure.

(*Second stage*) The obtained gas expands partially in a gasification chamber and the developed energy is used to inject in this same chamber a quantity of burned gases mixed with dilution air, the burned gases come from the combustion chamber at the same pressure that this chamber has; this is to increase the gas mass. This expansion is almost isothermal because the dilution air combines with the gas to form "air gas" in an isothermal reaction that helps to keep the initial temperature and to get a better gasification. With or without a supplementary gasification chamber, the gas expands on the high pressure injector until it gets to the combustion chamber's pressure and kinetic energy developed is used to drag and compress in the chamber the air needed for the combustion and for the injecting gas dilution. The needed calories for the vaporization and gasification of the high pressure gas are furnished by a heat interchanger, getting those calories from the gases going to the autoinjector, cooling it.

(2) *Autoinjector's cycle.*—The kinetic energy developed by the high pressure injector isn't enough to compress the required air quantity to the corresponding pressure on the combustion chamber. The autoinjectors furnish the power lacking to equilibrate the energetic balance, and are simple devices that work in the same way that the ones feeding the boilers. The autoinjectors inject on the combustion chamber air with the gas, originated in the combustion chamber, previously cooled. The autoinjector's system is a closed circuit: the gas comes from the combustion chamber, goes to the final chamber's heat interchanger, then to the autoinjectors and after the expansion, goes once more to the combustion chamber obtaining again the lost calories. Trying not to increase the air's compression work because of the inevitable heating of the air by the gas that must compress it, it is necessary to cool the gas previously in a way that when it reaches the injector's exit, its temperature has to be very close to that of the dragged air.

The calories taken from the gases are given to the high pressure gas that is to be gasified and to increase the calorical content of the main jet exit of the gas generator. The gas cooling begins at the combustion chamber and precisely on the annular chamber that precedes the exit; to follow on the double recuperator of the pushing chamber and ends according to the needs on the exterior coolers. The calories on this last case are not recuperable.

(3) *Air cycle.*—The variations on temperature, volume, pressure and mass increase of the air represents the active part of the whole cycle.

The process is as follows: the air at atmospheric temperature is dragged and compressed into the combustion chamber by injectors, when the combustion is done the burned gases expand in a second chamber which compresses more air using the whole available energy correspondent at the pressure change, the second chamber could be the low pressure chamber and heat recuperator, or a second combustion chamber, in this case the pressure of it could be greater than the first chamber's.

In the second chamber, autoinjectors are not needed but if it is desired to increase the flow of dragged air, low pressure injectors are used and they are fed by the low pressure chamber gases, with or without a second combustion chamber. The flow of burned gases expand into the low pressure chamber (which acts as a heat exchanger) dragging and compressing in it an additional quantity of air (always using the kinetic energy at disposal developed by the change of pressure).

Considering that the medium temperature of the mixture of air and burned gases entering on the low pressure chamber is lower than the gases that go from the combustion chamber to the autoinjectors, and because of the need of cooling these gases like it has already been explained. Considering that the medium temperature of the burned gases and dragged air mixture that enters on the low pressure chamber is lower than the temperature of the gas going from the combustion chamber to the autoinjectors, it is necessary to cool this last gas and because of the already explained reasons it is circulated on the double heat interchanger of the low pressure chamber; making that the main flow that enters on it receives part of the heat of the gas that is cooling. Doing so, the recuperation of the cooling calories of the gas going to the autoinjectors is almost total, and the mass of air dragged on the cycle is very great.

The system can be developed on series, on parallel or on mixed according to the needs of required power, space for use, and efficiency desired.

The gas generator is composed of the following groups:
(1) High compression system, it could also have the autoinjectors.
(2) Medium pressure chamber, or combustion chamber.
(3) Low pressure chamber, with a heat interchanger.
(4) Cooling circuit.

HIGH PRESSURE, FIRST STEP

The engine driven hydraulic pump 94 with a feed-check valve to control the flow and pressure compresses into a circuit, that later on is going to be described, proportional quantities of fuel and water. The pump 94 compresses the liquid mixture to a pressure of 160 atmospheres to the tube 96 and cools the "venturi's" critical section 26 that gives entrance to the combustion chamber 42 circulating in a jacket 98 set around this section and thus begins the mixture's preheating that goes into this jacket at 288 degrees K. and gets out through tube 99 at circa 320 degrees K., at this temperature goes into the second heat interchanger 100 of the low pressure chamber 68 and comes out at 750 degrees K. already vaporized. By the tube 102 the vapors go to a coil 104 set at the annular camera 54 communicated by the passage 51 to the combustion chamber 42 and they get heated up by the burned gases going out through the conduit 114. It is here that the gasification process ends. The vapors reheated by these gases reach a temperature of 1200–1300 degrees K. and turn into a high pressure permanent gas. During the gasification the high pressure and temperature submit the gases to a "cracking" process but without leaving a carbon deposit because it is combined with the water steam and thus forming "water gas" which includes carbon monoxide (CO), hydrogen ($H_2$), among other gases. The hydrogen that gets liberated in this process brings out an energic hydrogenation of the combustible vapors turning them into permanent gases, and because of the high temperature and pressure the molecular equilibrium will tend to form a greater quantity of methane.

The potential energy and the thermic contents of the produced gas will be circa 11% over the caloric content that initially the fuel had on its mixture with the water.

SECOND STEP

The produced gas at a pressure of 160 atmospheres and at the gasification temperature goes to the injector 12 where it suffers the first pressure drop and expanding from 160 to 80 atmospheres, injects into the gasification chamber 20 by a convergent-divergent 118 a part of burned gas coming from the combustion chamber 42. This gas is taken from the tube 16 from the gas that feeds the autoinjectors 34 at 660 degrees K. and it is cooled down to 450 degrees K. before being injected. The injected gas contains about 50% of dilution air and its containing oxygen gets combined with the high pressure combustible gas increasing the carbon monoxide (CO). The produced gas has a lower calorical power but increases the thermical and energetic content in a 11.5% (total), keeping the gas temperature high and without losing the calories that it would have lost because of the expansion and the mixture of high pressure gas with the burned gases. The obtained gas for having a lower caloric power needs less combustion and dilution air, so a bigger injecting mass could easily compress the air needed for this dilution and combustion.

The medium pressure gas provided from the combustion chamber that comes out at a high speed at the autoinjectors 34 drags and accelerates on the convergent 25 and later compresses at the venturi's contracted section 23 the air needed for the combustion and dilution. The compression is completed at the divergent tube 27 by the high pressure gas coming out of the nozzle 24 at the divergent tube. The gas slows down when it mixes in the antichamber 29 and then it gets to the burner 40. The combustion occurs (the ignition is made with spark or with catalytic igniter) at the best net efficiency conditions; the combusted gases go in two directions, the main part keeps going in the same direction and goes through the "venturi" 50 to form a jet, the other part of the gas that feeds the autoinjector goes in the opposite direction through 51 to the annular chamber 54 heating the coil 104 that is in this chamber, gasificates the vapors that are circulating in this coil. The gas flows by the tube 114 to the first heat interchanger 81 and going into the heat interchanger tubes 82 heats up the gases that are going through the low pressure chamber 68 and from this first heat interchanger goes to the second one where it heats up the coil 100 and the fuel and water mixture highly compressed gets vaporized. After the gas has gone through the two heat interchangers it has lost most of its calories. To get the gas at the desired final temperature it goes through the cooler 38 that is regulated by a thermo-regulated valve 119, it regulates the cooling air flow and consequently the autoinjectors gas temperature that varies according to the combustion chamber pressure, and it cools the gas down to a temperature of about 450 degrees K. to feed the second high pressure stage; in the gas generator of the stationary type or when an aircraft is taking off, the circulating air will be realized by the low pressure gas coming by the tube 112 to the ejector 120 which is regulated by the valve 124; in stationary installations, it could also be water cooled.

The described system developes a very high output and even close to theoretical output.

The gas jet goes through the outlet 50 at high speed and then into the venturi's convergent 74 to the low pressure chamber 68. The outside air 58 is dragged and compressed according to the energy developed by the change of pressure, if the mass flow has to be increased, autoinjectors 60 and 62 like the combustion chamber ones can be used. When the air and gases going into the chamber 68 are heated by the heat interchanger tubes 81 and guided by the deflectors 76 and 80 get to the final venturi's contracted section 84 and they expand out by the final nozzle 86.

The tube 10 has a cooled deviation 110 with a pressure regulating valve 108 which makes possible the filling of a gas reservoir 106 with the combustible high pressure gas.

When the gas generator has to be started, the valve 108 is open and the gases getting out of the reservoir go to the autoinjectors 12 and 24 at the required pressure and expanding and dragging the air and gas mixture through the venturi's convergent-divergent to the burner 40. When the ignition is done by an electric device or by an appropriate catalyzer begins the continuous combustion of the gases and fuel that are going through the burner. When the high pressure gets to the overheating temperature, the valve 108 is closed and opened again when the combustion chamber reaches its right working pressure and the valve is definitely closed when the gas reservoir 106 is full again. The compressed gas reservoir 106 has a valve 107 to discharge the condensation which by the means of the tube 109 is suctioned by the pump 94. This operation is done after the starting.

Although an exemplary embodiment of the invention has been disclosed herein for purposes of illustration, it will be understood that various changes, modifications, and substitutions may be incorporated in such embodiment without departing from the spirit of the invention as defined by the claims which follow.

We claim:

1. A device for producing high temperature gas utilizing fuel and air comprising:
    a combustion chamber for burning the fuel and the air to produce a high temperature combustion gas, said combustion chamber having an inlet and an outlet;
    a nozzle having a nozzle passageway therethrough, said nozzle passageway having an inlet and an outlet, said outlet of said nozzle passageway being adjacent said inlet of said combustion chamber and closer thereto than said inlet of said nozzle passageway;
    an injector having a plurality of orifices generally confronting said nozzle passageway with the injector and orifices being spaced from the wall of said passageway to provide an air inlet thereabout;
    means for supplying a high temperature gaseous fuel to at least one of said orifices; and
    means for supplying a portion of said combustion gas to at least one other of said orifices, the flow of said gaseous fuel and said combustion gas through said nozzle passageway inducing air flow through said air inlet into said nozzle passageway and to said combustion chamber.

2. A device for producing high temperature gas utilizing fuel and air comprising:
    a combustion chamber for burning the fuel and the air to produce a combustion gas, said combustion chamber having an inlet and and outlet;
    a nozzle having a nozzle passageway therethrough, said nozzle passageway having a converging inlet and a diverging outlet, said outlet of said nozzle passageway being adjacent said inlet of said combustion chamber and closer thereto than said inlet of said nozzle passageway;
    a combustion gas injector means having a plurality of orifices generally confronting said nozzle passageway, at least a portion of said injector means being spaced from the converging inlet wall of said nozzle passageway to define an air inlet therebetween;
    fuel injector means adjacent said inlet of the nozzle passageway for supplying a high velocity gaseous fuel stream to the nozzle, said fuel injector means being located generally centrally of and spaced from the inlet of said passageway to leave the air inlet open; and
    means for supplying a portion of said combustion gas to at least some of said orifices, the flow of said gaseous fuel and said combustion gas through said nozzle passageway inducing airflow through said air inlet into said nozzle passageway and to said combustion chamber.

3. A device for producing high temperature, high energy gas comprising:
    a combustion chamber having an outlet;
    means for introducing fuel to said combustion chamber;
    means for introducing compressed air to said combustion chamber, said fuel and air at least partially burning in said combustion chamber to produce high temperature gas at said outlet;
    passage means for conducting said high temperature gas from said outlet to an area spaced from said combustion chamber;
    means for inducing flow of relatively cool air into said high temperature gas in said passage means to produce a high mass gas stream, said high mass gas stream having a temperature less than the temperature of said high temperature gas;
    heat exchanger means secured to said passage means at said area;
    conduit means for bleeding a portion of said high temperature gas from said combustion chamber to said heat exchanger means, said portion of high temperature gas heating said high mass gas stream to produce the high temperature, high energy gas; and
    means for extracting energy from said high temperature, high energy gas stream.

4. A device for producing high temperature gas utilizing fuel and air comprising:
    a combustion chamber for burning the fuel and the air to produce a high temperature combustion gas, said combustion chamber having an inlet and an outlet;
    a nozzle having a nozzle passageway therethrough, said nozzle passageway having a converging inlet and a diverging outlet, said outlet of said nozzle passageway being adjacent said inlet of said combustion chamber and closer thereto than said inlet of said nozzle passageway;
    a combustion gas injector means having a plurality of orifices generally confronting said nozzle passageway, at least a portion of said injector means being spaced from the converging inlet of said nozzle passageway to define an air inlet therebetween;
    fuel injector means adjacent said inlet of the nozzle passageway for supplying a high velocity gaseous fuel stream to the nozzle, said fuel injector means being located generally centrally of and spaced from the inlet of said passageway to leave the air inlet open;
    means for supplying a portion of said combustion gas to orifices of the combustion gas injector means, the flow of said gaseous fuel and said combustion gas through said nozzle passageway inducing airflow through said air inlet into said nozzle passageway and to said combustion chamber;
    passage means for conducting said combustion gas from said combustion chamber outlet to an area spaced from said combustion chamber;
    means for imparting a high velocity to the gas within said passage means and simultaneously induce air flow into said gas to produce a high mass gas stream; and
    means adjacent said area for heating said high mass gas stream to produce the high temperature gas.

5. A device for producing high temperature gas utilizing fuel and air comprising:
    a combustion chamber for burning the fuel and the air to produce a high temperature combustion gas, said combustion chamber having an inlet and an outlet;
    a nozzle having a nozzle passageway therethrough, said nozzle passageway having a converging inlet and a diverging outlet, said outlet of said nozzle passageway being adjacent said inlet of said combustion chamber and closer thereto than said inlet of said nozzle passageway;
    a combustion gas injector means having a plurality of orifices generally confronting said nozzle passageway, at least a portion of said injector being spaced from the converging inlet of said nozzle passageway to define an air inlet therebetween;
    fuel injector means adjacent said inlet of the nozzle passageway for supplying a high velocity gaseous fuel stream to the nozzle, said fuel injector means being located generally centrally of and spaced from the inlet of said passageway to leave the air inlet open;

means for supplying a portion of said combustion gas to said orifices of the combustion gas injector means, the flow of said gaseous fuel and said combustion gas through said nozzle passageway inducing airflow through said air inlet into said nozzle passageway and to said combustion chamber;

passage means for conducting said high temperature gas from said outlet of the combustion chamber to an area spaced therefrom;

means for inducing flow of relatively cool air into said high temperature gas and said passage means to produce a high mass gas stream, said high mass gas stream having a temperature less than the temperature of said high temperature gas;

heat exchange means secured to said passage means at said area; and conduit means for bleeding a portion of said high temperature gas from said combustion chamber to said heat exchange means, said portion of high temperature gas heating said high mass gas stream to produce the high temperature gas.

6. A device as defined in claim 5 including means for extracting energy from said high temperature gas stream.

References Cited
FOREIGN PATENTS 522,163   3/1921   France.
1,011,439   4/1952   France.

MARK NEWMAN, *Primary Examiner.*

RALPH D. BLAKESLEE, *Examiner.*